United States Patent [19]

Faig et al.

[11] Patent Number: 5,033,955

[45] Date of Patent: Jul. 23, 1991

[54] ARTICLE MOLD HANDLING APPARATUS

[75] Inventors: Harold Faig; Raymond E. Ross, both of Cincinnati, Ohio

[73] Assignee: Cincinnati Milacron Inc., Cincinnati, Ohio

[21] Appl. No.: 597,090

[22] Filed: Oct. 10, 1990

[51] Int. Cl.$^5$ .............................................. B29C 45/04
[52] U.S. Cl. .................................... 425/589; 425/406; 425/412; 425/450.1; 425/451.6; 425/451.9
[58] Field of Search ................ 425/406, 408, 412, 451, 425/451.5, 451.6, 451.9, 589, 450.1

[56] References Cited

U.S. PATENT DOCUMENTS

| | | | |
|---|---|---|---|
| 2,095,299 | 11/1936 | Thweatt et al. | 425/211 |
| 3,128,505 | 10/1961 | Ludwig | 425/577 |
| 3,523,328 | 8/1970 | Huff et al. | 425/589 |
| 3,624,672 | 11/1971 | Spivy | 425/589 |
| 3,981,671 | 9/1976 | Edwards | 425/453 |
| 4,191,523 | 3/1980 | Niederst | 425/451.9 |
| 4,212,614 | 7/1980 | Holzinger | 425/451.9 |
| 4,354,819 | 10/1982 | Wirz | 425/409 |
| 4,699,584 | 10/1987 | Kurita et al. | 425/450.1 |
| 4,708,625 | 11/1987 | Arend | 425/589 |

Primary Examiner—Willard E. Hoag
Attorney, Agent, or Firm—Nies, Kurz, Bergert & Tamburro

[57] ABSTRACT

Mold handling apparatus especially adapted for use in a reaction injection molding machine. A pair of platens is supported in a frame, and one of the platens is adaped to be moved toward and away from the other by means of a toggle-type actuation system. The movable platen is slidably carried on a plurality of movable platen guide rods that are contained within longitudinally extending frame members that define the frame for the machine. A stationary platen is pivotally supported by the frame member for pivotal movement about a vertical axis through an angle of approximately 90°. The movable mold platen includes a movable mold carrier plate that is pivotally carried for movement about a second vertical pivot axis through an angle of about 90°. The pivot axis for the movable mold carrier plate is offset from the longitudinal axis of the machine, in a direction toward the operator, so that pivotal movement of the mold mounting plate causes the mold half containing the molded part to be presented directly to the machine operator. The pivotal movement of each of the mold members permits the mold surfaces to be cleaned, if necessary, and also permits the convenient application of mold release agents, or the like.

16 Claims, 3 Drawing Sheets

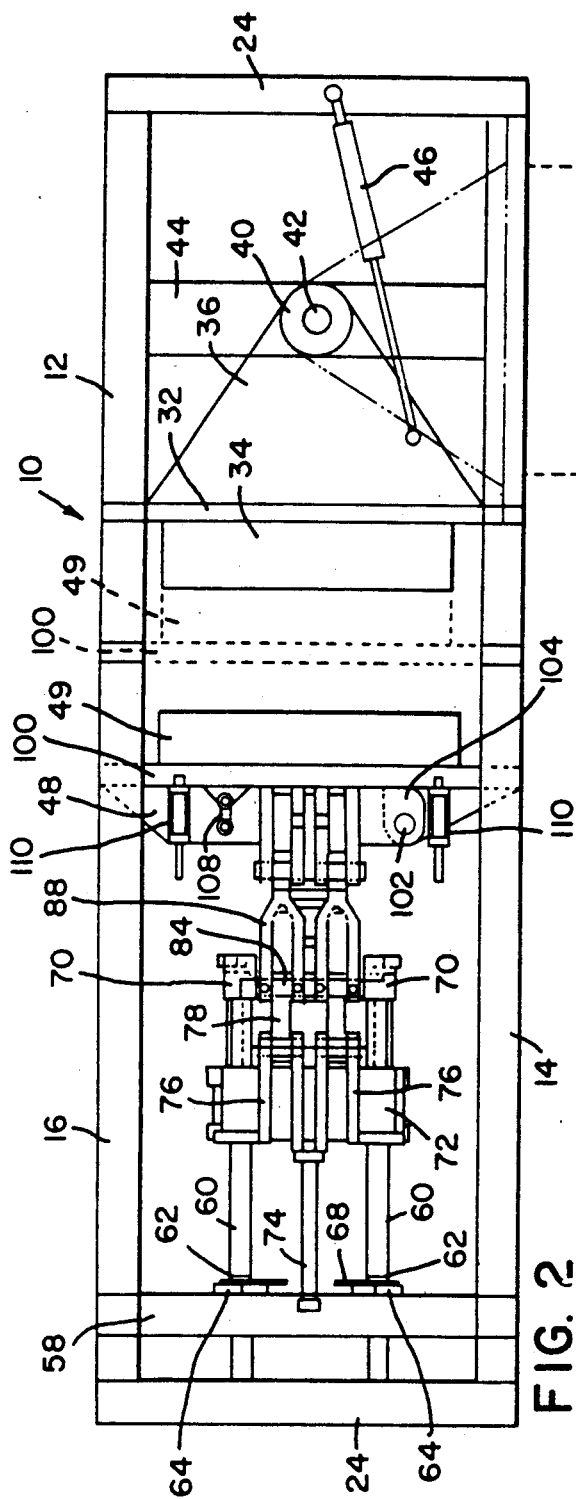

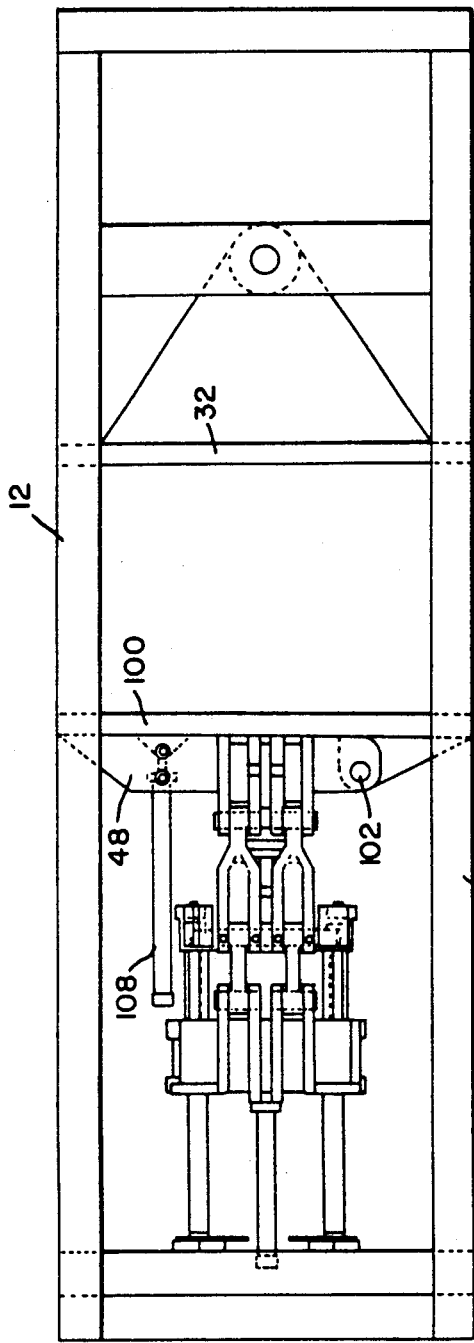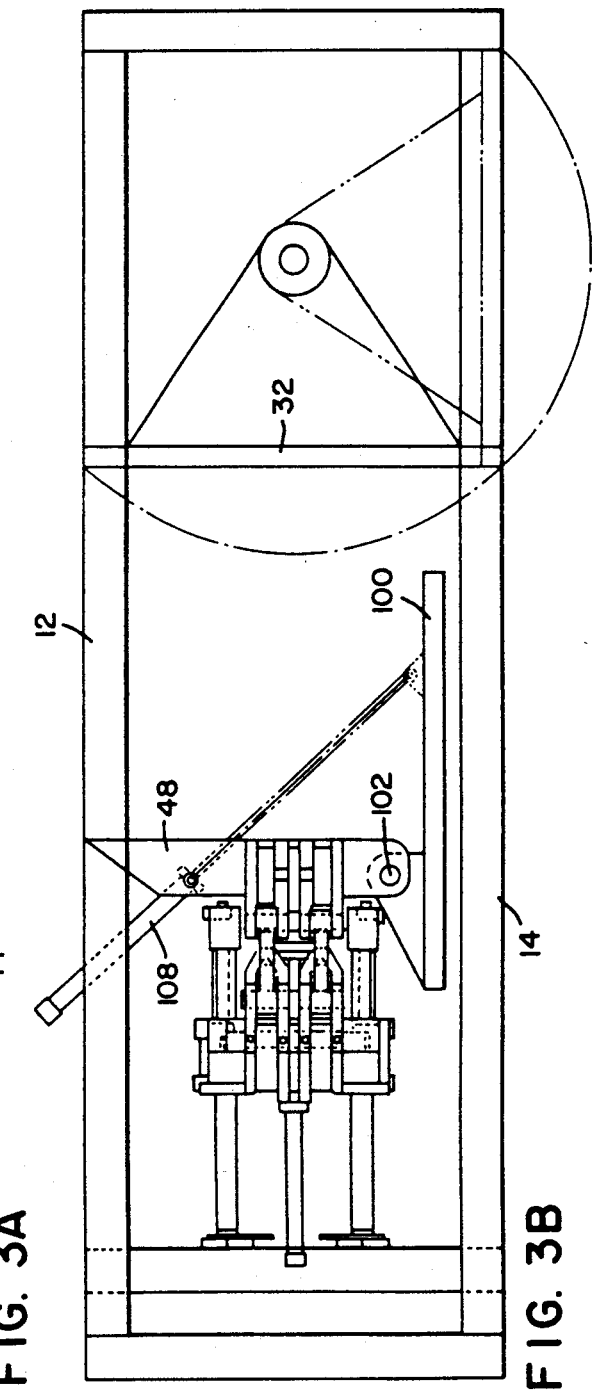

ARTICLE MOLD HANDLING APPARATUS

BACKGROUND OF THE INVENTION

1. Field of the Invention

The present invention relates to apparatus for handling molds used for molding articles from flowable plastic materials. More particularly, the present invention relates to apparatus for handling large molds such as are used in connection with reaction injection molding machines, the apparatus serving for selectively opening and closing cooperating mold portions that together define a cavity within which the molded article is to be formed. Additionally, the apparatus permits pivotal movement of the respective mold members to facilitate access to the article-defining surfaces of the molds, and also to facilitate removal from the mold of a formed article.

2. Description of the Related Art

The molding of large automobile body parts, such as front or rear bumpers or the like, requires very large and very heavy molds, as compared with the usual molds for the more commonly found, smaller injection molded articles. Moreover, the materials from which such automobile body parts are often made is a polyurethane material that is introduced into the mold cavity as a liquid and is prepared as a mixture of a polyol and an isocyanate. Such materials are introduced into a mold cavity under substantially lower pressures than are conventional thermoplastics, such as polyethylene or polypropylene, that are commonly used in an injection molding machine. For example, molding pressures in a reaction injection molding machine are such that the forces necessary to hold the mold portions together are frequently of the order of about 100 tons or so, whereas injection molding machines in which plasticated material is injected under a very high pressure, sometimes require mold closing forces of the order of about 3000 tons or so.

One form of mold handling apparatus for such reaction injection molding machines is shown and described in U.S. Pat. No. 3,981,671, which issued Sept. 21, 1976, to Bobbie Lee Edwards. That Edwards patent is commonly owned by the assignee of the present application, and it discloses a mold handling system in which a pair of molds are arranged one above the other adjacent the facing ends of a generally C-shaped frame, and wherein each of the molds is pivotable about its own horizontally extending pivot axis.

The Edwards patent also discloses pivoting the entire apparatus about a horizontal axis so that the molds are movable toward and away from each other in a horizontal direction. Although the apparatus disclosed in that patent is eminently suitable for its intended purpose, it results in a rather large and a tall machine, which in its vertical orientation of the molds requires lifting of very heavy mold members. Further, in its horizontal configuration the mold members are at an elevation above the ground that renders it difficult and inconvenient to remove a molded article from the mold.

Another form of mold handling apparatus for a reaction injection molding machine is illustrated and described in U.S. Pat. No. 4,708,625, which issued on Nov. 24, 1987, to Donald P. Arend. That patent discloses an arrangement wherein the molds are positioned for horizontal movement relative to each other, and each mold supporting structure is pivotally arranged to pivot about a vertical axis. One of the mold handling portions of the apparatus includes an hydraulic drive arrangement for moving its associated mold portion toward and away from the other mold portion. However, the apparatus disclosed in the Arend patent is also large and cumbersome, and it also requires the movement of large and heavy structural mold support elements of the device, which requires considerable power and high capacity drive motors. As a result, movement of the mold portions in the Arend device is slow because of the high inertia of the parts to be moved.

It is an object of the present invention to provide a mold handing apparatus for a reaction injection molding machine that permits more rapid movement of the mold members to reduce the time for completing a molding cycle.

It is a further object of the present invention to provide a mold handling apparatus for a reaction injection molding machine in which the mold members are each pivotable relative to each other and readily accessible to a machine operator.

It is a still further object of the present invention to provide a mold handling apparatus for a reaction injection molding machine in which the mold portion that carries the molded article after its formation can be rapidly pivoted toward the machine operator to facilitate rapid removal of the molded part from the mold.

SUMMARY OF THE INVENTION

Briefly stated, in accordance with one aspect of the present invention, a mold handling apparatus is provided for supporting a pair of separable, cooperable mold members that define a mold cavity therebetween for molding an article from material that is introduced into the mold cavity. The apparatus includes a base member that has a longitudinal axis, and a first mold support carried by the base member for pivotally supporting a first mold member for movement about a first pivot axis. A second mold support is carried by the base member for pivotally supporting a second mold member for movement about a second pivot axis. The second pivot axis is spaced longitudinally along the base member from the first pivot axis and is offset laterally relative to the longitudinal axis of the base member. Actuating means are provided for moving one of the first mold support and the second mold support toward and away from the other in the direction of the longitudinal axis of the base member, to selectively open and close the mold cavity.

BRIEF DESCRIPTION OF THE DRAWINGS

FIG. 1 is a side elevational view showing a mold handling apparatus in accordance with the present invention for handling a pair of pivotable mold mounting plates adapted to carry respective portions of a cavity-defining mold.

FIG. 2 is a top view of the apparatus illustrated in FIG. 1.

FIGS. 3A and 3B are additional top view of the apparatus illustrated in FIG. 1 to show, respectively, the relative positions of the mold platens when the molds are in the closed position and the relative positions of the mold platens when the molds are open and the movable platen has been pivoted outwardly.

DESCRIPTION OF THE PREFERRED EMBODIMENTS

Figure 4:
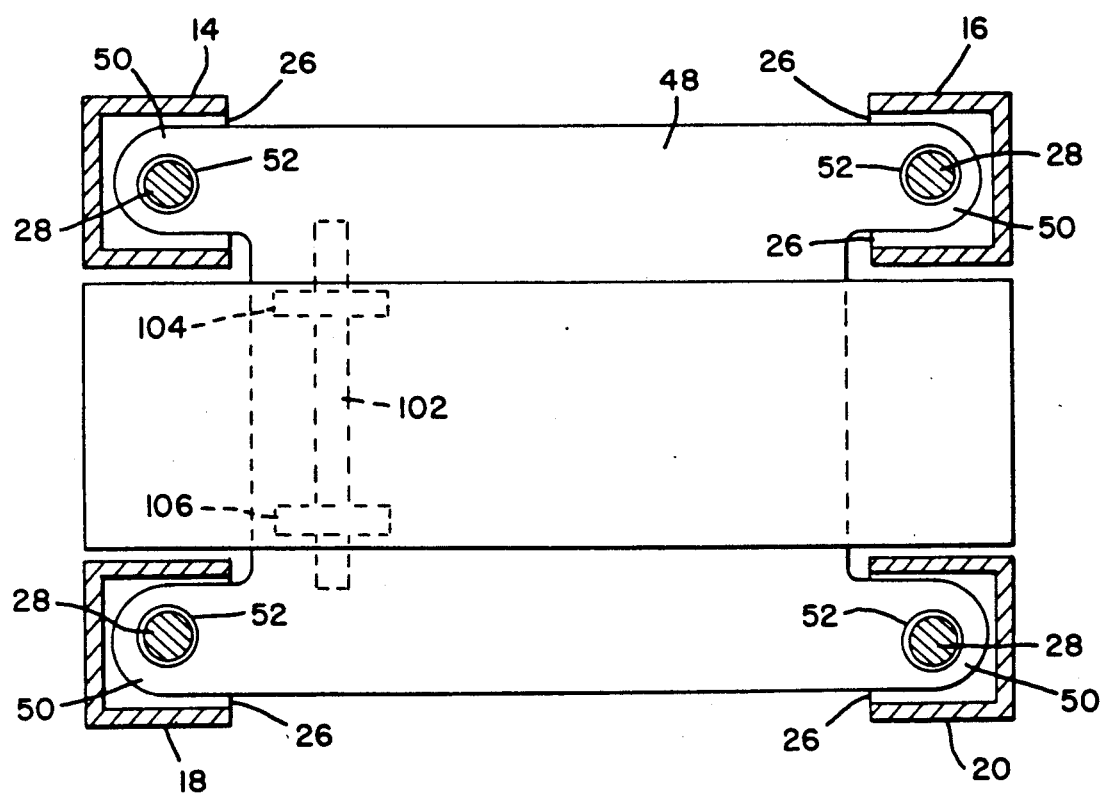
FIG. 4 is a cross-sectional view taken along the line 4-4 of FIG. 1.

Referring now to the drawings, and particularly to FIGS. 1 and 2 thereof, there is shown a mold handling apparatus 10 in accordance with the present invention, including a box-beam-type frame 12 of rectangular configuration. Frame 12 includes a pair of longitudinally extending top frame members 14, 16 that are parallel with each other, and a pair of longitudinally extending, parallel bottom frame members 18, 20 (see FIG. 4) that are parallel with and spaced from top frame members 14, 16. Additionally, at each longitudinal end of the frame are respective vertically positioned end frame members 2 that interconnect the top and bottom frame members, and also transverse end frame members 24 that extend between the respective top frame members 14, 16 and the respective frame members 18, 20, all of which members are securely connected together, such as by welding, to provide a rigid structural frame 12 for supporting the several parts of the machine. Preferably, each of the frame members is provided in the form of a box beam, in which the inner portion of the frame members is hollow.

As best seen in FIG. 4, an intermediate portion of each of the top and bottom frame members 14, 16, 18, and 20 includes interiorly facing openings 26 to permit access to each of four movable platen guide rods 28, one of which is positioned within each of the top and bottom frame members. Each of guide rods 28 is carried and supported by a pair of longitudinally spaced guide rod support blocks 30 that are secured in position within each of the top and bottom frame members to securely hold and properly orient each of movable platen guide rods 28.

A first platen 32 is provided for supporting one mold member 34 of a mold in a predetermined position relative to the longitudinal axis of the machine. First platen 32 is securely positioned so that it is incapable of movement along the longitudinal axis of the machine.

A pair of horizontally disposed, vertically spaced support plates 36, 38 are provided and are secured to the rear face of first platen 32. As shown, support plates 36, 38 are of generally triangular configuration, and adjacent the apices of each support plate is positioned a journal bearing 40 that is received in a vertically extending pivot pin 42 that is securely held between respective transverse intermediate frame members 44, only one of which is shown and is visible in FIG. 2.

First platen 32 is of generally rectangular configuration, as viewed in the longitudinal direction of the machine, and is adapted to be rotated about pivot pin 42 from a first position shown in solid lines in FIG. 2 to a second position shown in dashed lines in FIG. 2, in order to present to an operator positioned on the side of the machine that mold cavity surface that is part of mold member 34 carried by first platen 32. When the mold cavity surface is so presented, the operator can easily clean the mold surface, and can also quickly apply a mold release agent, or the like, to facilitate the molding and part removal operations.

Pivotal movement of first platen 32 is effected by means of an actuator cylinder 46 that has its rod end pivotally carried by upper horizontal support plate 36, and has its cylinder end pivotally carried on transverse end frame member 24. As illustrated in FIG. 2, first platen 32 is preferably adapted for pivotal movement through an arc of about 90° from the solid line position, in which platen 32 is substantially perpendicular to the longitudinal axis of the machine, to the dashed line position, at which the face of platen 32 is substantially parallel with the longitudinal axis of the machine.

Positioned longitudinally along the machine axis from first platen 32 is a second platen 48 that is movable along the longitudinal axis of the machine, toward and away from first platen 32. Second platen 48 is slidably carried on and is movable along movable platen guide rods 28.

Referring now to FIG. 4, second platen 48, which is preferably of rectangular configuration, includes outwardly extending ears 50 extending laterally outwardly at each of its upper and lower edges. Ears 50 carry journal bearings 52 to permit smooth, unimpeded movement of second platen 48 along movable platen guide rods 28. As also seen in FIG. 4, each of top and bottom frame members 14, 16, 18, and 20 has a longitudinally extending opening 26 that is of sufficient size to permit respective ears 50 to extend into the interior of the respective top and bottom frame members and to be freely movable along guide rods 28.

Referring once again to FIGS. 1 and 2, second platen 48 carries a mold portion 49 that is cooperable with mold portion 34 that is carried by first platen 32. As shown, the respective mold members 34, 49 can be respectively male or female molds, to permit the molding of parts having a predetermined wall thickness or wall thickness distribution. Alternatively, each of mold members 34, 39 can have opposed recesses to together define a cavity of predetermined configuration when the mold members are brought together into contacting relationship.

Spaced longitudinally along the machine axis from second platen 48 at the opposite side thereof from first platen 32 is a die height platen 58 that is supported for movement along four parallel toggle guide rods 60, the axes of which are positioned in a generally rectangular array. Each of toggle guide rods 60 includes an externally threaded end 62 that is received in a die height adjustment nut 64. Each adjustment nut 64 is rotatably carried by die height platen 58 to permit extension or retraction of the respective toggle guide rods 60 relative to platen 58. The extension or retraction is accomplished by means of a die height drive motor 66 (see FIG. 1) that through a drive chain 68 drives each of the driven sprockets that are rigidly connected with respective ones of die height adjusting nuts 64. The opposite ends of toggle guide rods 60 are supported by a pair of toggle guide rod outer supports 70 (see FIG. 2), which extend vertically between vertically spaced pairs of toggle guide rods 60.

Slidably carried by the respective toggle guide rods 60 is a toggle platen 72 that is adapted to be moved in a direction along the longitudinal axis of the machine by means of a toggle actuation cylinder 74 that extends longitudinally from die height platen 58 toward second platen 48.

A pair of side-by-side upper link support yokes 76 is carried by toggle platen 72 to pivotally support one end of respective upper first toggle links 78. Similarly, a pair of side-by-side lower link support yokes 80 is also carried by toggle platen 72 to pivotally support one end of respective lower first toggle links 82. The outer ends of each of upper first toggle links 78 and lower first toggle links 82 closest to second platen 48 are pivotally carried on an upper pivot pin 84 and a lower pivot pin 86, respectively, to which an end of respective upper second toggle links 88 and lower second toggle links 90 are also pivotally connected. The opposite ends of each of the respective second toggle links are pivotally connected with second platen 48 through respective second link support yokes that are carried by platen 48.

Also connected to upper and lower pivot pins 84 and 86 are respective upper and lower toggle actuator links 90, 92 that extend inwardly toward the center of the machine, and that each terminate at a pinned connection to toggle crosshead 94. A crosshead support rod 96 extending from toggle cylinder 74 passes through toggle platen 72 to carry crosshead 94 at its outer end. Thus, actuation of toggle cylinder 74 causes inward or outward movement of crosshead support rod 96, which, in turn, moves the respective links to cause second platen 48 to move either toward or away from toggle platen 72.

As best seen in FIG. 1, toggle platen 72 is supported on a pair of parallel ways 98, only one of which is visible in FIG. 1. Ways 98 provide bearing surfaces to permit longitudinal movement therealong of toggle platen 72 with minimal friction.

Referring once again to FIG. 4, a generally rectangular mold mounting plate 100 is pivotally carried by second platen 48 and rides on a vertically extending pivot pin 102 that is carried by second platen 48 at a point spaced laterally outwardly from the longitudinal axis of the machine. Mold mounting plate 100 includes an upper pivot bearing support 104 and a lower pivot bearing support 106, each of which includes a bearing (not shown) to permit free pivotal movement of mold mounting plate 100 relative to second platen 48 and about the axis of pivot pin 102. Movement of mold mounting plate 100 about pivot pin 102 (see FIGS. 3A and 3B) is effected by a mold plate pivoting cylinder 108 that has one end connected with mold mounting plate 100 and the opposite end connected with second platen 48. Actuation of pivoting cylinder 108 causes mold mounting plate 100 to pivot through an angle of approximately 90°, to thereby present to the machine operator the mold portion carried by second platen 48 to facilitate removal from the movable mold of the molded article. In addition to carrying pivoting cylinder 108, mold mounting plate 100 also can carry article ejector cylinders 110 to actuate ejector pins (not shown) to physically push molded parts from the molding surface of mold portion 49. The structure and operation of ejector pins and associated ejector actuator cylinders are well known to those skilled in the art and are therefore not described in detail herein.

In FIG. 2, mold mounting plate 100 connected with second platen 48 is shown in full lines in its retracted position, in which the mold members 34 and 49 are spaced from each other. However, after second platen 48 has been moved toward first platen 32, to the molding position where the molds are in contact, mold mounting plate 100 is in the position shown in dashed lines in FIG. 2.

After molding has taken place and the molds have been separated from each other, either first platen 32 or mold mounting plate 100, or both, can be pivoted outwardly, as shown by the arcs in FIGS. 2 and 3B, toward an operator on the side of the machine through and through an angle of about 90° so that the mold to which the molded article remains attached faces outwardly and is substantially parallel with the longitudinal axis of the machine. The article can then be removed from the mold and the respective mold portions can be treated with a mold release agent, or the like. Reversal of the process by pivoting one or both of the platens inwardly toward the machine centerline permits resumption of the molding operation to form another molded part.

It can thus be seen that the present invention provides distinct advantages in that the movable sections of the machine are of substantially lighter weight than those of the prior art devices. Thus, the present machine permits more rapid movement of the parts, because of reduced inertia, and also permits the pivotal movement of the molds for convenient and safe removal of molded parts and also for additional operations on the mold surfaces.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. Mold handling apparatus for supporting a pair of separable, cooperable mold members defining a mold cavity therebetween for molding an article from material introduced into the mold cavity, said apparatus comprising:
   a. a base member having a longitudinal axis;
   b. first mold support means carried by the base member for pivotally supporting a first mold member for movement about a first pivot axis;
   c. second mold support means carried by the base member for pivotally supporting a second mold member for movement about a second pivot axis, the second pivot axis spaced longitudinally along the base member from the first pivot axis and offset laterally therefrom relative to the longitudinal axis of the base member; and
   d. means for moving one of the first mold support means and the second mold support means toward and away from the other in the direction of the longitudinal axis of the base member to open and close a mold cavity.

2. Mold handling apparatus in accordance with claim 1, including first pivoting means carried by the base member for pivoting the first mold support means about the first pivot axis, and second pivoting means for pivoting the second mold support means about the second pivot axis.

3. Mold handling apparatus in accordance with claim 1, wherein the first and second pivot axes are vertically disposed to permit movement in a substantially horizontal plane.

4. Mold handling apparatus in accordance with claim 1, wherein the second mold support means is movable linearly toward and away from the first mold support means.

5. Mold handling apparatus in accordance with claim 4, including toggle-type actuating means for linearly moving the second mold support means.

6. Mold handling apparatus in accordance with claim 5, wherein the second mold support means includes a movable mold support platen supported for movement toward and away from the first mold support means.

7. Mold handling apparatus in accordance with claim 6, wherein the base member includes movable mold support platen guide means for guiding linear movement of the movable platen.

8. Mold handling apparatus in accordance with claim 7, wherein the guide means includes a plurality of longitudinally extending guide rods supported from the base member.

9. Mold handling apparatus in accordance with claim 8, wherein the base member is at least partially of hollow construction and the guide means are contained within a hollow portion of the base member.

10. Mold handling apparatus in accordance with claim 6, wherein the second mold support means includes a mold mounting plate pivotally carried by the movable mold support plate for pivotal movement about the second pivot axis.

11. Mold handling apparatus in accordance with claim 10, wherein the second pivot axis is disposed substantially vertically to permit a mold carried by the mold mounting plate to be swung outwardly from the longitudinal axis of the base member toward and away from an operator.

12. Mold handling apparatus in accordance with claim 11, including actuator means carried by the second mold support platen for pivoting the mold mounting plate relative to the second mold support platen.

13. Mold handling apparatus in accordance with claim 12, wherein the actuator means is an hydraulically operable piston and cylinder.

14. Mold handling apparatus in accordance with claim 1, wherein the first mold support means is pivotally supported about a substantially vertical pivot axis to permit pivoting of the first mold support means in a substantially horizontal plane in a direction toward and away from the base member longitudinal axis.

15. Mold handling apparatus in accordance with claim 14, including actuator means supported by the base member for pivoting the first mold support member relative to the base member.

16. Mold handling apparatus in accordance with claim 15, wherein the actuator means is an hydraulically operable piston and cylinder.

* * * * *